April 8, 1969    R. J. GRUBER    3,436,927
FOOD FREEZING AND PROPORTIONING METHOD AND APPARATUS
Filed Feb. 23, 1968    Sheet 1 of 3
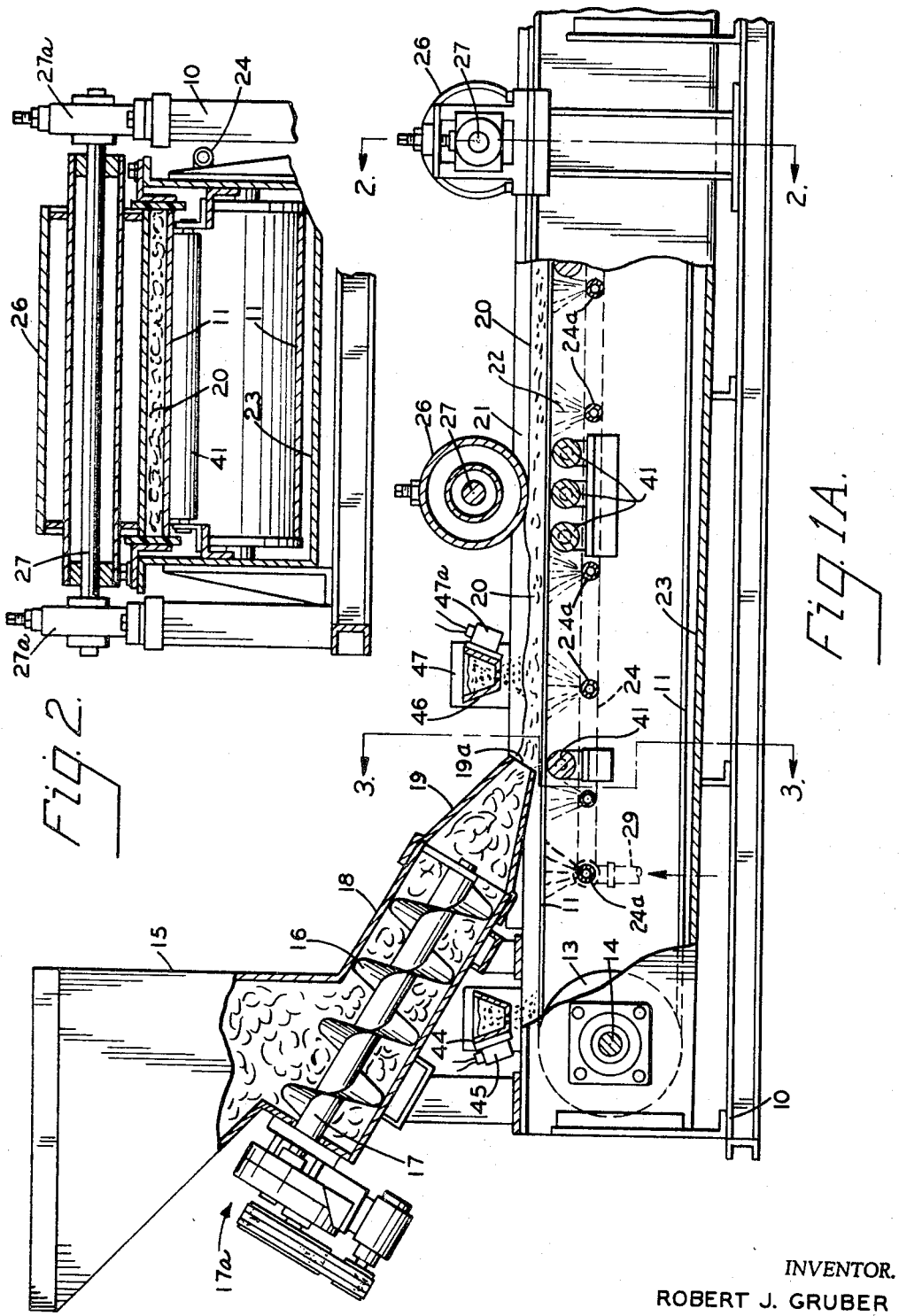
INVENTOR.
ROBERT J. GRUBER
BY
Baldwin, Egan, Walling & Fetzer
ATTORNEYS.

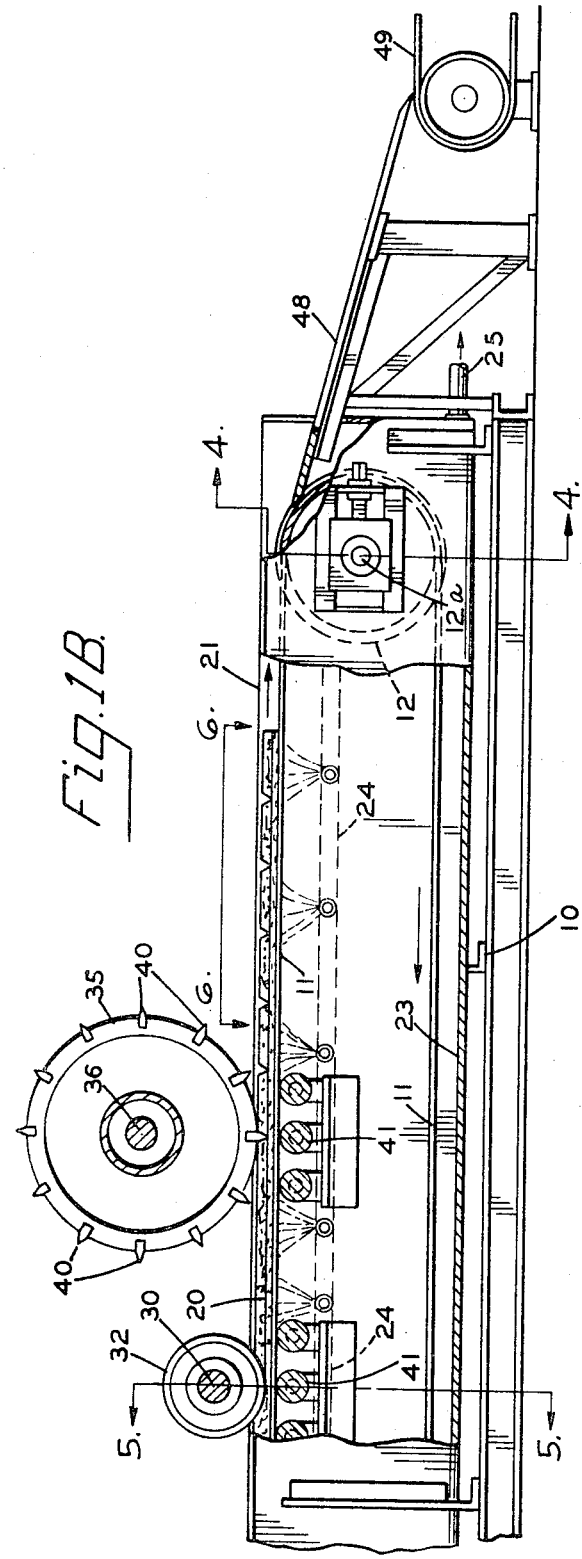
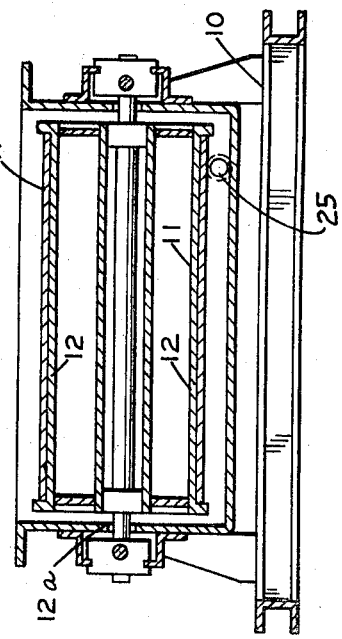
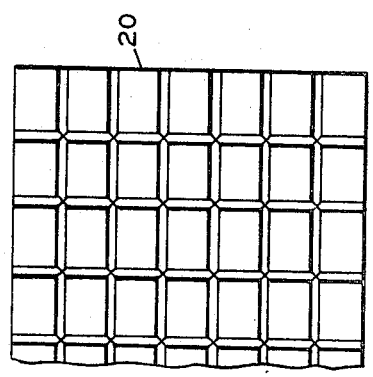
INVENTOR.
ROBERT J. GRUBER

INVENTOR.
ROBERT J. GRUBER
BY
Baldwin, Egan, Walling & Fetzer
ATTORNEYS.

United States Patent Office 3,436,927
Patented Apr. 8, 1969

3,436,927
FOOD FREEZING AND PROPORTIONING
METHOD AND APPARATUS
Robert J. Gruber, 4575 Concord Drive,
Cleveland, Ohio 44126
Filed Feb. 23, 1968, Ser. No. 707,634
Int. Cl. A23b *3/06;* F25c *5/02*
U.S. Cl. 62—75
8 Claims

ABSTRACT OF THE DISCLOSURE

Loose broken food parts, such as fish, are extruded from a hopper through a spreader funnel for deposit in a continuous strip of approximately the desired finished thickness on a moving stainless steel conveyor belt. Freezing brine is sprayed on the under side of the belt. Side boards hold the strip to the width of a plurality of finished food portions. Part way down the belt, where the food is only partly frozen, the strip is slit part way through its thickness longitudinally along parallel lines to the desired widths, and thereafter the strip is scored part way through its thickness crosswise along parallel lines to desired lengths. At the end of the conveyor belt the finished frozen food portions are removed and broken apart.

Specification

Figure 3:
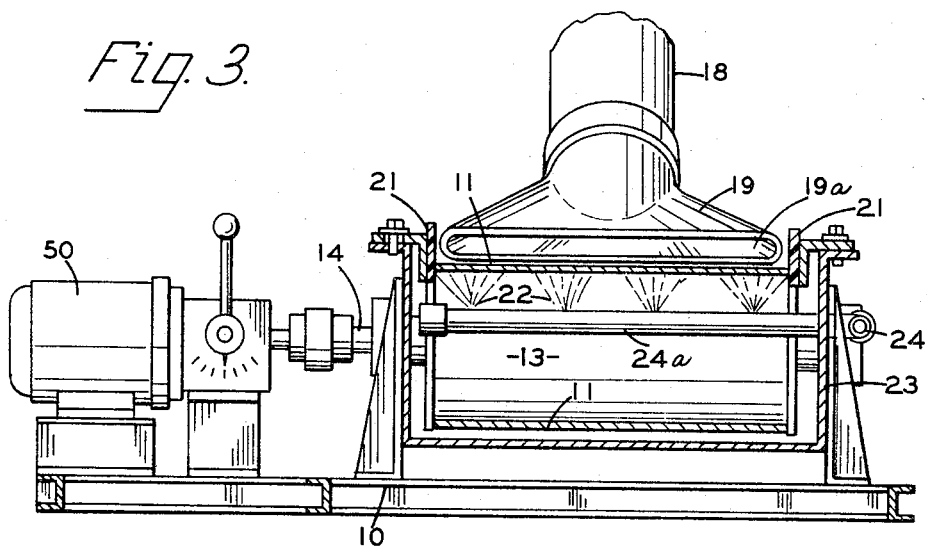

The present method of making a conventional rectangular fish block into breaded fish portions is done in a two-stage operation. First, the block is made from boneless fish flesh frozen under pressure in rectangular cartons and thereafter portions of the desired dimension are cut from the blocks with power band saws. The present invention provides a method and apparatus whereby the completed frozen fish portion is made in a one-stage operation.

This invention will be described as dealing with fish, although it will be understood that it could be equally effective with meats and other foods which need to be formed and frozen and cut into the portions of exact dimensions.

An object of the present invention is to provide frozen fish portions of exact dimensions starting with boneless fish flesh fed from a supply hopper to a constantly moving belt through an extruder device which will place upon the belt a strip whose thickness is slightly greater than that desired in the finished product and whose width is equal to an exact multiple of the desired width of the finished portions. The product is gradually frozen as it moves along the belt path and at a point where it is only partly frozen, it is slit partly through longitudinally to divide the strip into exact widths and then scored crosswise partly through to the dimensions of the desired portion lengths so that it arrives frozen at the end of the conveyor belt marked in exact portion sizes so that the parts are then easily broken apart for further processing, such as breading.

Other objects and advantages of this invention will be apparent from the accompanying drawings and description and the essential features thereof will be set forth in the appended claims.

In the drawings,

FIGS. 1A and 1B, taken together, show a side elevational view of one form of apparatus, partly in section, for carrying out this invention;

FIGS. 2, 3, 4 and 5 are sectional views taken along similarly numbered lines of FIGS. 1A and 1B; while FIG. 6 is a fragmental top plan view taken from the position of the line 6—6 of FIG. 1A.

A frame 10 supports an endless conveyor belt 11 which is an imperforate sheet of material having good heat conductivity, stainless steel being preferred because food is handled. The belt passes over an idler drum 12 on adjustable shaft 12a at one end of the frame and a drive drum 13 at the opposite end of the frame which is driven by a shaft 14 supported in frame 10 and driven by variable speed motor means 50. A hopper 15 is provided at the upstream end of conveyor belt 11, supported on frame 10 or otherwise, and into which boneless fish flesh is placed prior to the present forming operation. This would be whole or part filets.

Means is provided to extrude or expel the fish flesh from hopper 15 onto the upper surface of conveyor belt 11. This is here shown as an extruder screw 16 having a shaft 17 which is driven by suitable power means 17a. This screw operates in a generally cylindrical sleeve 18 which is a reasonably snug fit around the periphery of the screw. The fish flesh is discharged by the screw 16 into a funnel-like spreader 19 whose cross section varies smoothly from a circle at the extruder discharge end to an elongated slot at 19a where the fish material is extruded onto the upper surface of the belt. Preferably the areas at the discharge from the extruder 16, the area at slot 19a, and the shape of spreader 19 are such as to extrude a strip 20 the full width of belt 11 and which is substantially uniform in thickness. Slot 19a has a thickness slightly greater than that desired in the finished food portion and it has a width approximately equal to that of the belt 11 so as to provide a strip on the belt approximately exactly equal in width to that of the width of a plurality of finished pieces of the frozen food product. This strip 20 is held to the desired width and guided by parallel side rails 21 rigidly secured to frame 10.

Means is provided for freezing the strip 20 as it moves down the conveyor belt in the direction of the arrows of FIGS. 1A and 1B. The means shown here are a plurality of sprays 22 beneath belt 11 and spraying upwardly against the under side of the belt a freezing brine spray. These are regularly spaced along the length of the belt sufficiently to freeze the strip 20 before it arrives at the discharge end toward the right of FIG. 1B. The brine is caught in a tank 23 on frame 10 as the brine falls downwardly after impinging against the belt. A supply of brine is provided (not shown) at a very cold temperature, preferably about —45° F. Pump means (not shown) delivers the brine under pressure at the left end 27 of pipe 24 supplying the sprays 22 and the brine from tank 23 is drained away at 25 to return to the cold brine supply source.

As the strip 20 of fish material travels with belt 11, means is provided to flatten the strip and make the top of it perfectly level and reducing it to the exact thickness of the desired finished food portion. Herein the means is shown as two levelling rollers 26 extending the full width of the strip 20 and rotatably supported by shafts 27 which are received in bearings mounted in suitable brackets connected with frame 10. Power means (not shown) is provided to rotate the rollers 26. The distance between the lowest zone on rollers 26 and belt 11 is that of the desired thickness of the finished product.

Figure 5:
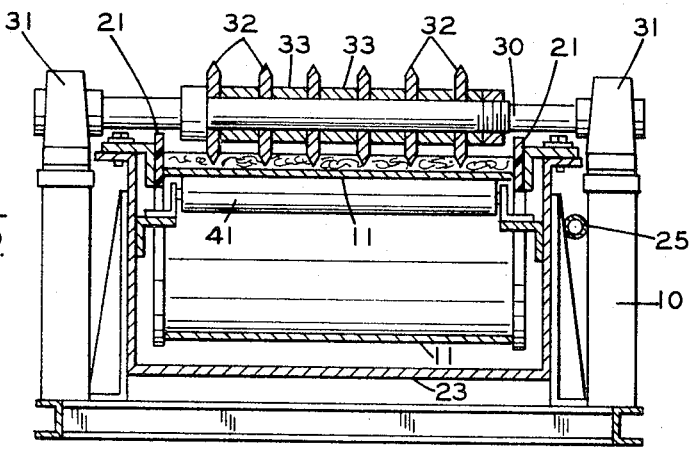

Means is provided to cut the strip 20 partly through its thickness along longitudinal lines so as to divide it into the widths of the finished food portion. Here this is shown as a spindle 30 mounted for idling rotation in bearings supported by brackets 31 on frame 10. As seen in FIG. 5, on this spindle there are supported a series of circular cutting knives 32 spaced by collars 33 on spindle 30 at the exact width of the desired finished product. These knives slit the strip 20 longitudinally along parallel lines as the strip and the belt 11 move beneath the knives. The relationship of the cutting knives 32 and the upper surface of belt 11 is such that the knives cut through a major portion of the thickness of the strip 20 from the top downwardly. Preferably, this cut extends about two-thirds of the way through the thickness of strip 20.

Means is also provided to score the strip 20 crosswise so that it may be separated into finished food portions of the desired length. Referring to FIG. 1B, an idler drum 35 is provided on a shaft 36 which is supported in suitable bearings supported by brackets on the frame 10. Lengthwise of this drum and crosswise of strip 20 there are supported a plurality of scoring knives 40 which are regularly spaced about the drum 35 at the desired length of the finished food portion. These knives 40 at the lowest point of their travel embed themselves into the strip 20 for a major portion of its thickness from the top down and preferably about two-thirds of the thickness.

The belt 11 is supported along its upper run to prevent sagging and particularly supported beneath rollers 26, cutting knives 32 and the scoring drum 35. This support is here shown as a plurality of idler rolls 41 suitably mounted in frame 10 so as to engage the under side of belt 11 and give it a firm support.

If necessary to avoid sticking of the strip 20 either to the belt 11 or to the rollers and cutters which engage it on its upper side, means may be provided to spread a nonsticking material both beneath and above the strip 20. As clearly shown in FIG. 1A, a trough 44 extending the full width of the belt 11 is provided at a point where the belt is still empty. This trough is filled with finely divided material such as flour and there is an opening in the bottom of trough 44 for dispensing the flour onto the upper face of belt 11. Preferably, an electrical vibrator 45 is provided to insure a constant supply of flour onto the belt 11. Another similar trough 46 is supported on brackets 47 attached to frame 10 so that this trough is above the strip 20 after it is deposited on the conveyor belt. This trough is filled with flour or similar material and is provided with a bottom opening to dispense the flour evenly across the strip 20. A vibrator 47a is provided to insure a constant deposition of flour when needed.

At the discharge end of belt 11, at the right-hand end of FIG. 1B, the strip 20 is completely frozen and ready for further use. A stripper plate 48 is suitably supported on frame 10 substantially in engagement with the belt 11 as it starts to pass around the drum or pulley 12. This plate is inclined to the right and downwardly and the finished food portions will travel down this plate and may be received on a conveyor 49 to carry them away for further processing such as a breading operation. However, it will be understood that the disposition of the finished portions after they leave the plate 48 has no part in the present invention. These finished portions, slit and scored as shown in FIG. 6, should be sufficiently brittle at this point to break apart as they are stripped off the belt 11 and as they fall onto the conveyor 49 or into a container. However, a breakup device may be supplied at this point to separate the individual finished frozen food portions and such equipment, of course, would have nothing to do with the present invention.

Here in one form of this invention, the belt 11 is between 20 to 24 inches in width and approximately 20 feet long, but, of course, these dimensions may be varied as necessary.

What is claimed is:
1. A method of freezing and proportioning broken food portions comprising the steps of (1) extruding a mass of said food in a compressed cross-section having a width equal to that of a plurality of finished portions and having a thickness slightly greater than that of a finished food portion; (2) continuously extruding said mass to form a continuous strip while moving said strip horizontally away from its zone of formation; (3) flattening said strip, as it moves, to the thickness desired in a finished portion; (4) forming said strip to a width approximately that of a plurality of finished portions; (5) freezing said strip gradually as it moves horizontally; (6) slitting said strip, before it is completely frozen and as it moves, partially through its thickness along parallel longitudinal lines spaced at the width of a finished portion; (7) deep scoring said strip, before it is completely frozen and as it moves, partially through its thickness along parallel lines crosswise of said slits and spaced at the length of a finished portion; (8) completing the freezing of said strip; and (9) removing and breaking apart, along said slit lines and said score lines, said finished frozen portions.

2. A method as defined in claim 1, wherein said strip is moved horizontally on the upper surface of a conveyor belt; and said freezing is provided by applying a cold fluid against the under surface of said belt.

3. Apparatus for freezing and proportioning broken food portions comprising a frame; a hopper adjacent to one end of said frame for holding loose broken food pieces; and endless conveyor belt extending from a point adjacent the bottom of said hopper and away therefrom in a generally horizontal direction; means for driving said belt; extruding means supported above said belt and having an intake end in communication with said hopper; said extruding means having a discharge end above and adjacent said belt and adapted to spread food in a strip across said belt slightly thicker than that desired in a finished portion; means for driving said extruder; means on said frame confining said strip in a path having approximately the exact width of a plurality of finished portions; means on said frame and above said strip on said belt engaging said strip and flattening it to said desired thickness; means on said frame applying a fluid at freezing temperature in operative relationship to said food on said belt to freeze said food gradually as it travels along said belt; means on said frame above said belt for engaging said food strip while partly frozen and for slitting said strip downwardly for a major portion of its thickness along parallel longitudinal lines spaced at the width of a finished portion; means on said frame above said belt for engaging said food strip while partly frozen for scoring said strip downwardly through a major portion of its thickness along parallel lines crosswise of said strip and spaced at the length of a finished portion; and means supported at the downstream end of said conveyor belt for removing said finished and frozen portions.

4. Apparatus as defined in claim 3, including means on said frame for applying a protective coating on said belt upstream from said extruding means; and means on said frame for applying a protective coating upon said food strip downstream from said extruding means.

5. Apparatus as defined in claim 3, wherein said conveyor belt is an uninterrupted sheet having good heat characteristics; and said means for applying freezing fluid comprises sprays impinging upon the underside of said belt.

6. Apparatus as defined in claim 3, wherein said means for slitting said strip comprises an idler roll mounted on said frame for rotation above said belt; parallel slitting disks extending peripherally from said roll and engaging said food strip; and spacing collars on said roll holding said disks separated.

7. Apparatus as defined in claim 3, wherein said means for scoring said strip comprises an idler roll mounted on said frame for rotation above said belt; scoring blades supported radially of said roll and extending outwardly therefrom in position to engage and enter into said food strip as it passes beneath said blades; and the outside diameter of the roll being spaced above said belt by the thickness of a finished food portion, whereby to flatten said strip as it is scored.

8. Apparatus as defined in claim 3, wherein said loose broken food pieces are noncomminuted fish.

References Cited

UNITED STATES PATENTS

| | | | |
|---|---|---|---|
| 2,027,255 | 1/1936 | Vogt et al. | 62—75 |
| 2,941,560 | 6/1960 | McCaffery | 146—78 |

ROBERT A. O'LEARY, *Primary Examiner.*

WILLIAM E. WAYNER, *Assistant Examiner.*

U.S. Cl. X.R.

62—320, 345; 99—195; 146—228